(12) United States Patent
Altman (10) Patent No.: US 8,525,485 B2
(45) Date of Patent: *Sep. 3, 2013

(54) SYSTEM AND METHOD FOR APPLYING PULSATION ENERGY TO ONLINE BATTERY BACKUP SYSTEMS

(75) Inventor: Roger Altman, Alexandria Bay, NY (US)

(73) Assignee: Canadus Power Systems, LLC, Warrensvile Heights, OH (US)

( * ) Notice: Subject to any disclaimer, the term of this patent is extended or adjusted under 35 U.S.C. 154(b) by 46 days.

This patent is subject to a terminal disclaimer.

(21) Appl. No.: 13/460,168

(22) Filed: Apr. 30, 2012

(65) Prior Publication Data

US 2012/0212187 A1   Aug. 23, 2012

Related U.S. Application Data

(63) Continuation of application No. 12/175,755, filed on Jul. 18, 2008, now Pat. No. 8,169,194.

(51) Int. Cl.
*H02J 7/00* (2006.01)
*H02J 7/04* (2006.01)

(52) U.S. Cl.
USPC ............................................. 320/139

(58) Field of Classification Search
USPC ......................................................... 320/139
See application file for complete search history.

(56) References Cited

U.S. PATENT DOCUMENTS

| | | | | |
|---|---|---|---|---|
| 5,726,553 | A | * | 3/1998 | Waugh .......................... 320/104 |
| 2005/0134231 | A1 | * | 6/2005 | Cho .............................. 320/141 |
| 2005/0248320 | A1 | * | 11/2005 | Denning ....................... 320/141 |
| 2009/0009141 | A1 | * | 1/2009 | Li ................................ 320/141 |

* cited by examiner

*Primary Examiner* — Arun Williams
(74) *Attorney, Agent, or Firm* — Thompson Hine L.L.P.

(57) ABSTRACT

A method of applying pulsation energy to an online battery backup system including the steps of sampling at least one voltage sampling circuit to monitor a float voltage drop across the terminals of each battery unit within a plurality of battery units, selecting from among the plurality of battery units the unit having the greatest float voltage drop, operating a pulse generation circuit to apply pulsation energy across the terminals of only the selected battery unit, and ceasing to operate the pulse generation circuit in response to a predetermined trigger. A generally corresponding method may be performed on each battery cell within the plurality of battery units. Also, battery pulsation systems for an online battery backup system may include a pulse generation circuit and a controller for selectively applying pulsation energy across the terminals of a selected battery unit or battery cell.

19 Claims, 7 Drawing Sheets

SYSTEM AND METHOD FOR APPLYING PULSATION ENERGY TO ONLINE BATTERY BACKUP SYSTEMS

BACKGROUND

The present patent application is directed to the art of battery charging and, more particularly, to systems and methods for charging and pulsating batteries in online battery backup systems.

Battery backup systems are employed to provide uninterrupted power to electronic equipment when power from the electric grid fails. When such backup systems charge and discharge, various products are generated by the electrochemical reactions which take place within the battery cells, and thermodynamic forces may cause those products to gradually alter to a more stable but less reactive form. For example, the discharge of a lead-acid battery produces an amorphous form of lead sulfate which may crystallize to form non-conductive deposits that are resistant to decomposition at charging and equalization voltages. Another example: charging a nickel-cadmium battery produces microcrystalline forms of hydroxyl—nickel oxide and metallic cadmium (serving as the anode and cathode, respectively, of the cell), but these materials tend to coalesce and/or grow to form larger crystalline deposits which can slow electro-chemical reaction rates due to mass transfer limitations at the electrode/electrolyte interface.

The accumulation of deposits such as those described above tends to degrade the capacity of the battery backup system by, depending upon the chemistry and construction of the cell, (1) reducing the amount of active material in the battery cell, (2) blocking the active material in an electrode from the electrolyte in the battery cell, and/or (3) increasing cell resistance. If sufficient deposits accumulate, the battery backup system may be unable to provide sufficient power due to a decline in voltage and/or loss of storage capacity in the battery cells, causing the powered electronic equipment to malfunction or prematurely fail.

Devices have been developed to counteract the accumulation of such deposits through the application of pulsation energy, generally in the form of radio frequency (RF) energy, during the charging of a battery or battery string. However, the batteries of an online battery backup system typically serve as a continuously connected source of power, operating in parallel with the electric grid in order to eliminate switchover time and reduce potential points of failure. If a battery pulsation device were to be used in an online battery backup system protecting critical or sensitive electronic equipment such as telecommunications equipment, the pulsation energy applied to the batteries may cause unacceptable levels of electro-magnetic interference (EMI) to be conducted and/or radiated into that equipment, interfering with its proper operation. Consequently, online battery backup systems require more frequent battery string replacements, whether of individual cells or the entire string, to maintain acceptable levels of reliability. However the application of pulsation energy would beneficially complement both offline and online management techniques by increasing battery service life, potentially lengthening the intervals between maintenance periods, and potentially shortening the time during which the battery string of the battery backup system is bypassed for maintenance.

Accordingly there is a need for a system and method for applying pulsation energy to online battery backup systems that includes features to limit or reduce the transmission of EMI into powered electronic equipment.

SUMMARY

In one aspect, the disclosed method for applying pulsation energy to an online battery backup system may include the steps of selecting at least one battery unit, but not all of the battery units, from a string of battery units and supplying pulsation energy to the selected battery unit/units. In a first particular aspect, the selected battery unit/units may be selected randomly. In a second particular aspect, the selected battey unit/units may be selected based upon a measured float voltage drop of the selected battery unit/units.

In one aspect, a battery pulsation system for online battery backup includes a pulse generation circuit operatively connected to a plurality of switch devices, a voltage sampling circuit, and a controller operatively connected to the pulse generation circuit, the plurality of switch devices, and the voltage sampling circuit. The plurality of switch devices may be operatively connected to the battery units of the online battery backup system and are configured so that a circuit can be formed between the pulse generation circuit and across any pair of terminals, with the controller being programmed to operate the pulse generation circuit and switch devices after sampling the voltage sampling circuit so as to apply pulsation energy across only one pair of terminals at a time. The system may also physically or functionally omit connections between the pulse generation circuit and one or more end battery units to further reduce the transmission of EMI into powered electronic equipment.

In another aspect, a battery pulsation system for online battery backup includes at least one pulse generation circuit and at least one voltage sampling circuit, with the circuits being operatively connectable to terminals on at least one of the plurality of battery units in the online battery backup system. A controller is operatively connected to the pulse generation circuit and the voltage sampling circuit, and programmed to sample the circuit voltage. The controller may obtain float voltage drops from the voltage sampling circuit, from separate sampling circuits, and from other battery pulsation modules making up the battery pulsation system. The controller operates the pulse generation circuit so as to apply pulsation energy to a pair of positive and negative terminals if the float voltage drop across that pair of terminals is greater than the float voltage drop across the other such pairs of terminals. The pairs of terminals may be the terminals of the battery units, or may be the terminals of the constituent cells making up the battery unit.

In yet another aspect, a method of applying pulsation energy to an online battery backup system includes the steps of (1) sampling at least one voltage sampling circuit to monitor a float voltage drop across the terminals of each battery unit within a plurality of battery units; (2) selecting from among the plurality of battery units the unit having the greatest float voltage drop; (3) operating a pulse generation circuit to apply pulsation energy across the terminals of only the selected battery unit; and (4) ceasing to operate the pulse generation circuit in response to a predetermined trigger. A generally corresponding method may be performed on each battery cell within a plurality of battery units. Operation of the method may also exclude one or more end battery units to further reduce the transmission of EMI into powered electronic equipment.

Other aspects of the disclosed system and method will become apparent from the following description, the accompanying drawings, and the appended claims.

DETAILED DESCRIPTION

Figure 1:
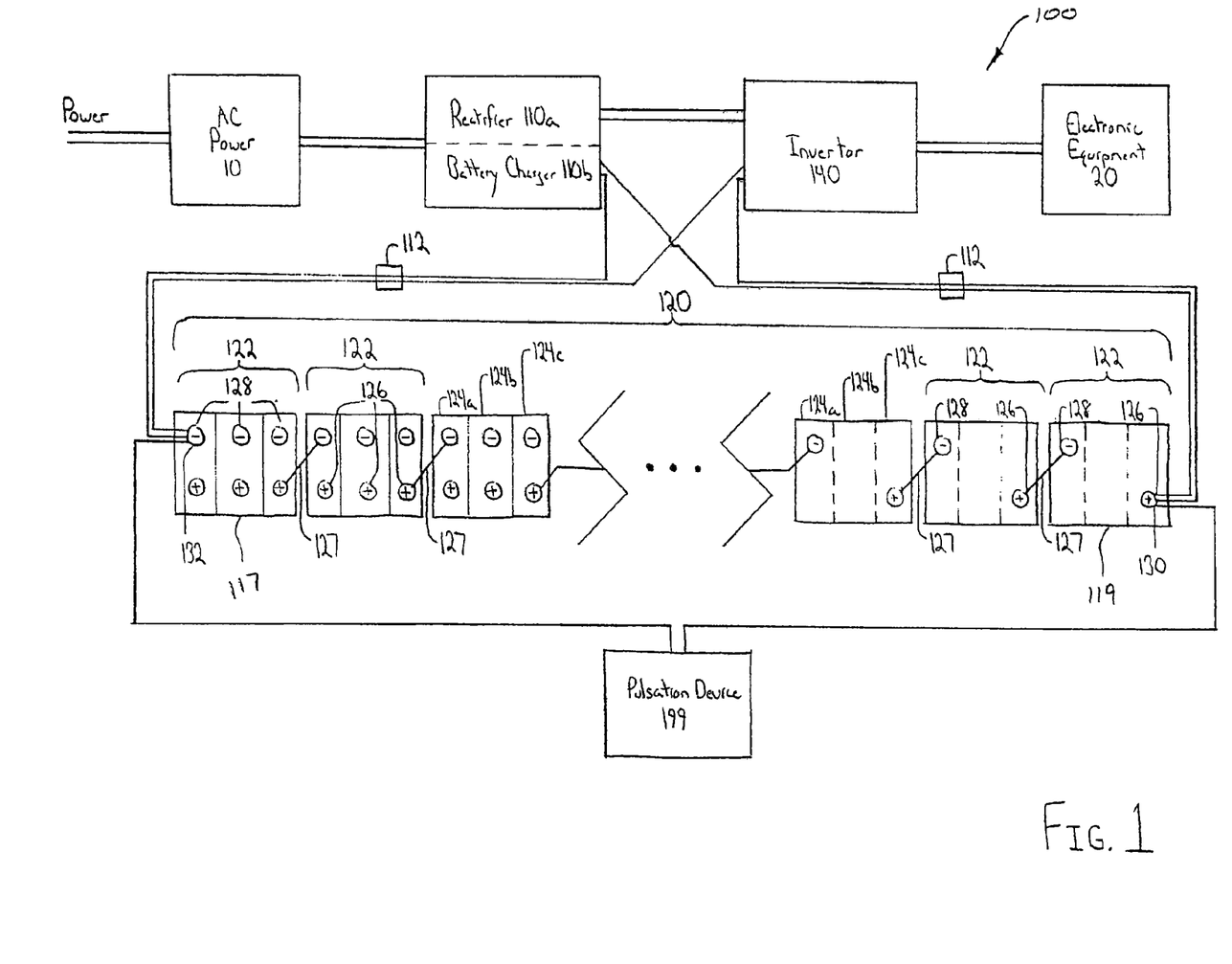
FIG. 1 is a functional diagram of an online battery backup system powering a telecommunications system device. A battery pulsation device 199 is shown as being connected to the battery backup system for exemplary purposes only.

Referring to FIG. 1, an online battery backup system, generally designated 100, may include an AC power source 10, typically an extension of the local electric grid, a rectifier/battery charger 110, a battery string 120, and a power supplier 140 for supplying equipment power to powered electronic equipment 20. The rectifier/battery charger 110 may be operatively connected to both the battery string 120 and the power supplier 140, with the battery string 120 operating in parallel with the rectifier to supply power to the power supplier 140. The power supplier 140 may be, for example, a DC-to-DC converter for regulating and/or altering DC power, a DC-to-AC invertor for regulating and supplying AC power, or a form of direct connection for equipment capable of operating over the useful voltage range of the battery string 120. The system 100 may also include circuit breakers 112 in order to allow for disconnection of the battery string 120 during maintenance. Additional components such as protective devices, monitoring circuitry, and the like may be present but are considered to be ancillary components and thus not shown for sake of simplicity. This description of an online battery backup system 100 is merely illustrative and is not intended to limit the disclosed system and method in any way. Those skilled in the art will appreciate that the disclosed system and method may be used with various battery backup systems, particularly systems requiring low electro-magnetic interference.

The battery string 120 that is common to battery backup systems generally includes a plurality of battery units 122 each including at least one battery cell 124. The battery units 122 may be manufactured to include only a single cell, or may be manufactured as a so-called "monoblock" unit including multiple cells 124a, 124b, 124c, etc. connected in series within a single casing. Preferably each battery cell 124 in each battery unit 122 provides a pair of positive and negative terminals 126, 128 in order to allow for monitoring of the cells, but in some systems each "monoblock" battery unit may provide only a single pair of positive and negative terminals 126, 128 which are connected in series with the unit's constituent cells. Both types of monoblock are shown in the figures for illustrative purposes (e.g., left and right halves of battery string 120 in FIG. 1), but typically only a single battery model would be used in a battery string 120 (e.g., battery strings 120 shown in FIGS. 2-3).

In one aspect, as shown in FIG. 1, the string 120 of battery units 122 may be connected in series and may include a negative end battery unit 117 and a positive end battery unit 119. When connected in series, the string 120 may provide a desired DC voltage, e.g., units providing twenty four lead-acid cells may be interconnected in series to form a 48V battery string for use in powering telecommunications equipment. The negative and positive ends 117, 119 of the battery string 120 may include negative and positive terminals 132 and 130, respectively, for connection to the rectifier/battery charger 110 and the power supplier 140 for supplying equipment power.

In operation, the online battery backup system 100 draws electrical power from an AC power source 10 and the rectifier/battery charger 110 converts the AC power to DC power. A rectifier portion 110a supplies DC power to the power supplier 140 for supplying equipment power, operating in parallel to the battery string 120, and a battery charger portion 110b sustains the battery string 120 by applying a float charge having a current and voltage sufficient to counteract self-discharge of the battery units 122. If the AC power source ceases to function, the rectifier/battery charger 110 will cease to function, but the current and voltage produced by the battery string 120 will continue to power the power supplier 140 and, indirectly, the powered electronic equipment 20. When AC power is restored, the rectifier portion 110a will again supply DC power to the power supplier 140, and the battery charger portion 110b will recharge the battery string 120 by applying a charging current and voltage in one of many well known manners.

In an offline battery backup system, most typically used with AC-powered equipment, the battery string 120 would be electrically isolated from similar means for supplying equipment power (most typically a DC-to-AC invertor) by a switch device that would be actuated when AC power failed. In such systems, a conventional battery pulsation device could be used to apply a modulated current and voltage, i.e., a series of pulses, across the entire battery string 120 with, for example, a current being modulated across the positive and negative terminals 130, 132 of a 48V lead-acid cell battery string to produce a pulse having a peak voltage of about 48V, a pulse width of about 200 to 300 nanoseconds, and a repetition frequency of about 10 kilohertz. Examples of such battery pulsation devices are disclosed in U.S. Pat. No. 5,648,714, the entirety of which is incorporated herein by reference. Variation of the pulse width and ringing within the circuit formed between the pulsation device and the battery string 120 would tend to produce pulsation energy having effective frequencies ranging from about $10^2$ to about $10^7$ Hertz, with the applied energy acting to reverse or prevent sulfation of the lead-acid cells. EMI generated by such a device would not typically be a concern in an offline system due to the isolation of the battery string 120 when AC power was available, and due to a lack of power to both the rectifier/battery charger and the battery pulsation device when AC power had failed. However EMI may be a significant problem in the online battery backup system shown in FIG. 1 because a battery pulsation device 199 would apply pulsation energy to both the battery string 120 and the power supplier 140 by virtue of its connection to the positive and negative terminals 130, 132 of the battery string 120. Such a connection would allow potentially significant levels of EMI to be conducted into the electronic equipment 20 through the power being delivered to that equipment and/or radiated into the electronic equipment 20 by emissions from the power supplier 140.

Systems for Applying Pulsation Energy

Figure 2:
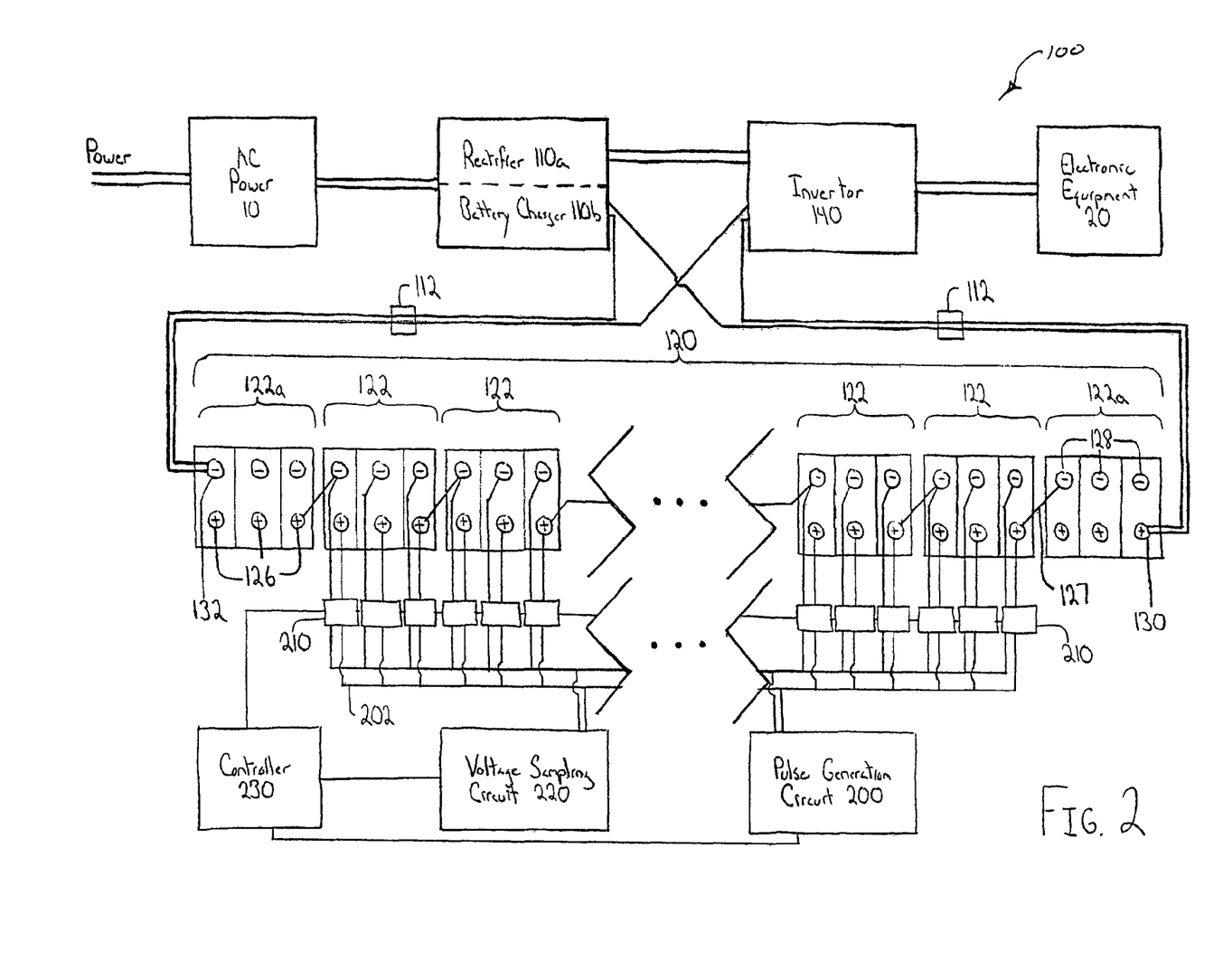
FIG. 2 is a functional diagram of a system for applying pulsation energy connected to an online battery backup system.
Figure 3:
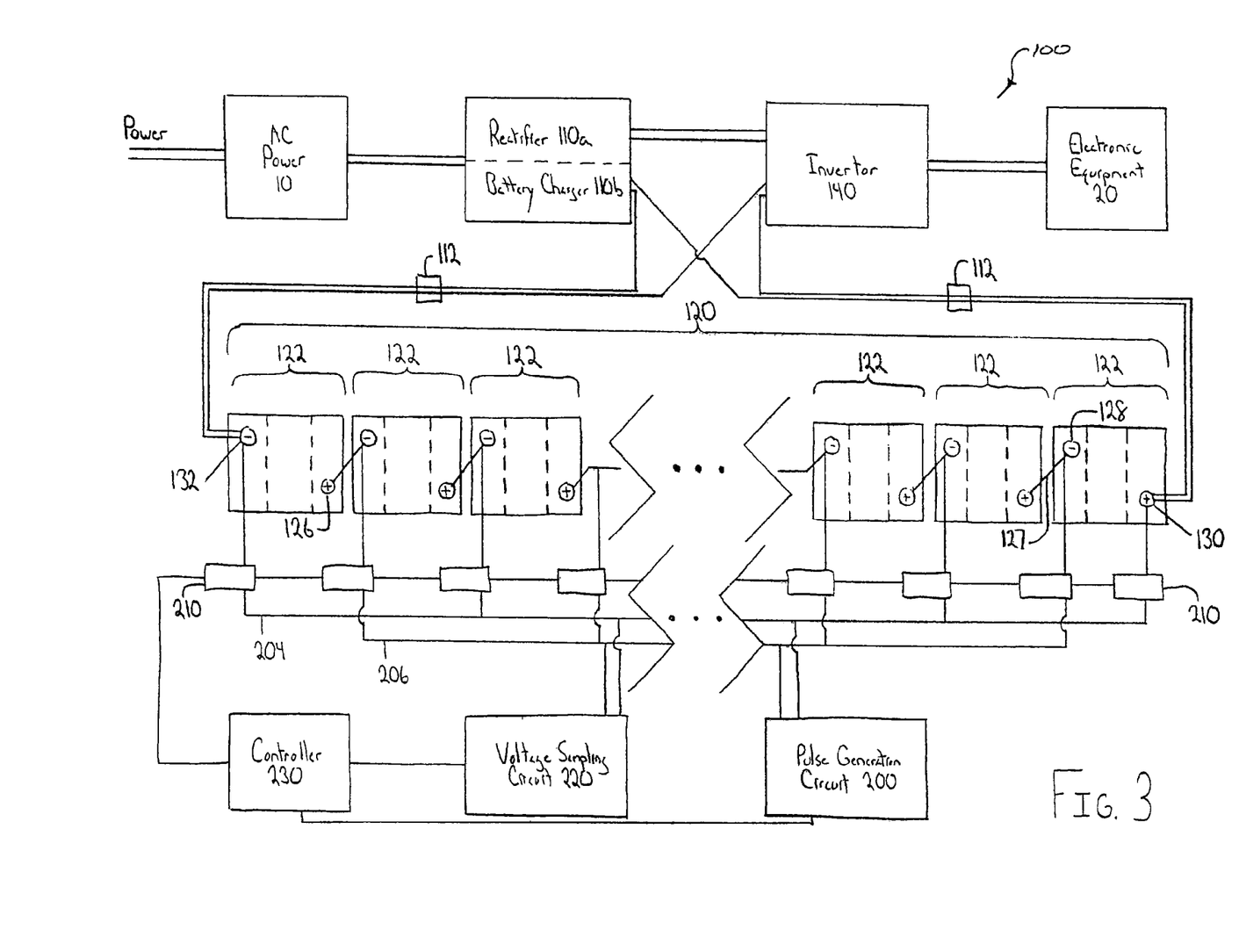
FIG. 3 is a functional diagram of another system for applying pulsation energy connected to an online battery backup system.

The power of the pulsation energy may be reduced and, preferably, may be applied remotely from the positive and negative terminals 130, 132 of the battery string 120 in order to limit or reduce the transmission of EMI into powered electronic equipment. In one aspect, as shown in FIGS. 2 and 3, the disclosed system may include a pulse generation circuit 200 adapted to apply a modulated current suitable for pulsing the individual battery units 122 within the battery string 120 or, preferably, the individual battery cells 124 therein. In one aspect, the pulse generation circuit 200 is adapted to vary the power of the pulsation energy based upon the number of cells in the battery units 122 and/or the amp-hour rating of individual battery cells 124. For example, the pulse generation circuit 200 may apply pulsation energy with a power sufficient to decompose crystals of lead sulfate that have formed within a lead-acid based battery unit 122 or battery cell 124, as appropriate, by modulating a current so as to produce pulse energy significant greater than the nominal 2V/cell charging voltage across positive and negative terminals 126 and 128. In another aspect, the pulse generation circuit 200 may be adapted to apply pulsation energy with a power sufficient to suppress, but not to reverse, the formation of deposits in relatively new batteries. For example, the pulse generation circuit 200 may apply pulsation energy with a power sufficient to prevent microcrystals of lead sulfate from growing into larger crystals, i.e., crystals which are resistant to decomposition by a typical float charging voltage, by modulating a current so as to produce a pulse having a peak voltage as little as 300 mV/cell (above the nominal 2V/cell charging voltage) across a pair of positive and negative terminals 126, 128.

It is important to note that peak voltage is cited only as a readily measurable parameter correlatable with the power of the pulsation energy being applied, and that other parameters such as instantaneous current, pulse width, and pulse repetition frequency will affect the power of the pulsation energy. Because of variations in battery cell chemistry, size, and construction (e.g., pocket plate and "jelly-roll" type constructions), the power of the pulsation energy to be applied may need to be determined empirically for a particular model or class of battery. For example, power levels for application to lead-acid batteries may be determined by determining the float voltage drop across a moderately used lead-acid battery unit or battery cell, as appropriate, applying pulsation energy while observing the peak voltage of the applied pulses, and redetermining the float voltage drop across the pulsed battery unit or battery cell after pulsation for about one to two hours. A differential in float voltage drop of less than about 5 mV would tend to indicate that desulfation had not taken place, and a power level below the transition between no indication of desulfation and some indication of desulfation can be determined. Thus a power level may be set that is sufficient to reverse sulfation, or a lesser power level may be set that is sufficient to suppress sulfation but insufficient to reverse existing sulfation. In another example, power levels to be used with nickel-cadmium batteries may be determined by measuring the discharge characteristics of a number of batteries which have been maintained on a float charge and subjected to a periodic shallow discharge for an aging period such as, e.g., one to three months. Battery pulsation devices may be set up to apply different levels of pulsation energy to different batteries during the aging period and, at the end of the period, a discharge voltage curve for each battery may be compared with those of unpulsed and newly obtained controls. A comparison of discharge voltage curves at a high discharge rate such as, e.g., about 2C, should reveal a discharge transition between a baseline consumption of readily available microcrystalline materials and a rate-limited consumption of materials affected by the formation of larger crystalline deposits, at least in those batteries which were exposed to little or no pulsation energy during the aging period. A comparison of discharge voltage curves where different levels of pulsation energy were applied should reveal a power level transition where rate-limited discharge is no longer readily observable, and a power level above the transition can be determined. Thus a power level may be set that is sufficient to suppress the coalescence/growth of microcrystalline materials in Ni—Cd battery cells.

The system shown in various aspects in FIGS. 2 and 3, may include a pulse generation circuit 200 operatively connected to a plurality of switch devices 210. In one aspect, the plurality of switch devices 210 may be operatively connectable to pairs of terminals 126, 128 on the individual battery units 122 and configured so that a circuit can be formed between the pulse generation circuit 200 and across the terminals 126, 128 of any one of the plurality of battery units 122. In a preferred aspect, the plurality of switch devices 210 is operatively connectable to pairs of terminals 126, 128 on the individual battery cells 124 and configured so that a circuit can be formed between the pulse generation circuit 200 and across the terminals 126, 128 of any one of the plurality of battery cells 124 within the plurality of battery units 122. The switch devices 210 may be, for example, electromechanical relays or solid state relays. A configuration shown in FIG. 2 includes a pulse generation circuit 200 operatively connected to a bus 202 with 2N switch devices 210 operatively connected to the terminals 126, 128 of N battery cells 124, but could also have 2N switch devices 210 operatively connected to the terminals 126, 128 of N battery units 122. The switch devices 210 in such a configuration may be double pole relays (serving as two switch devices each) connecting the positive and negative terminals 126, 128 to positive and negative bus portions. The configuration shown in FIG. 3 includes a pulse generation circuit 200 operatively connected to an "odd" bus portion 204 and an "even" bus portion 206, with N+1 switch devices 210 operatively connected to the terminals 126, 128 of N battery units 122, but could also have N+1 switch devices 210 operatively connected to the terminals 126, 128 of N battery cells 124. The switch devices 210 in such a configuration may be single pole relays (serving as one switch device each) connecting the terminal 130, series connections 127, and terminal 132 to the "odd" bus portion 204 and "even" bus portion 206 in alternating order. If using solid state relays, due consideration should be given to the voltage drop which typically occurs in such devices when conducting current and the need to pass pulsation RF energy, i.e., very low frequency to medium frequency RF energy, across the switch device 210 for application to the battery string 120.

The first system may further include a voltage sampling circuit 220. In one aspect, a voltage sampling circuit 220 may be operatively connected to the plurality of switch devices 210 in parallel with the pulse generation circuit 200. In this manner a single voltage sampling circuit 220 may be used to sample voltage differences across the terminals 126, 128 of any one of the plurality of battery units 122 or, preferably, across the terminals 126, 128 of any one of the plurality of battery cells 124 within the plurality of battery units 122. If the plurality of switch devices 210 has been configured to use the "odd" and "even" bus configuration described above, the voltage sampling circuit 220 may be designed to measure absolute voltage differences across a battery unit 122 or battery cell 124, as appropriate, or the system may otherwise account for the varying polarity of voltage differences sampled across the bus. In another aspect, a plurality of voltage sampling circuits 220 (not shown) may be dedicated to sampling voltage differences across the terminals 126, 128 of each battery unit 122 within the plurality of battery units 122 or, preferably, to sampling voltage differences across the terminals 126, 128 of each battery cell 124 within the plurality of battery units 122. Individual voltage sampling circuits would then be polled to measure the voltage difference across a particular battery unit 122 or a particular battery cell 124, as appropriate. Such a configuration would allow for essentially simultaneous comparison of the voltage difference across each battery unit 122 or battery cell 124, but would require a significantly greater number of circuit connections to a control element and/or provision for a shared data bus interconnecting the voltage sampling circuits 220 and a controller.

The first system may further include a controller 230 operatively connected to each of the pulse generation circuit 200, the plurality of switch devices 210, and the voltage sampling circuit(s) 220. The controller 230 may be a programmable logic controller, a general purpose microprocessor controlling I/O hardware, or a functionally equivalent combination of hardware and software providing for logic control of a plurality of circuits as well as data acquisition through an analog-to-digital converter. The controller 230 is programmed to sample the voltage sampling circuit 220, operate the plurality of switch devices 210, and operate the pulse generation circuit 200 according to an aspect of the methods described below.

Although the above-described system is described as providing operative connections between the pulse generation circuit 200 and the plurality of battery units 122 or, preferably, a plurality of battery cells 124 within the plurality of battery units 122, it is important to note that the plurality of battery units 124 does not necessarily include all of the battery units 124 present in the battery string 120. In some aspects, the system may apply pulsation energy remotely from the positive and negative terminals 130, 132 of the battery string 120 in order to limit or reduce the transmission of EMI into powered electronic equipment. In an aspect such as that shown in FIG. 2, the system may physically omit connections between the pulse generation circuit 200 and one or more end battery units 122a within the battery string 120. In another aspect such as that shown in FIG. 3, the system may functionally omit such connections, i.e., include but not use an otherwise operable connection for pulsation, by programming controller 230 to not apply pulsation energy directly to one or more of end battery units 122a within the battery string 120. By applying pulsation energy remotely from the positive and negative terminals 130, 132 of the battery string 120 and physically or functionally preventing pulsation energy from being applied directly to end battery units 122a, those end units may function as a form of RF shielding, reducing the levels of EMI at the positive and negative terminals 130, 132 of the battery string 120. By functionally omitting such connections, the system may still permit sampling of voltage differences across pairs of positive and negative terminals 126, 128 on the end battery units 122a in order to allow for diagnostic monitoring in support of other battery maintenance techniques such as, e.g., offline battery equalization.

Testing indicates that applying pulsation energy to battery units 122 or battery cells 124 proximal to other, unpulsed battery units, e.g., end battery units 122a, may have some beneficial effect on the service life of those battery units, but it is noted that such an effect is not necessary for beneficial use of the system. If the service life of the end battery units 122a is extended, then the interval between maintenance periods involving complete replacement of the battery string 120 may be lengthened. However if the service life of the end battery units 122a is not extended, then the battery string 120 may be maintained, in part, by bypassing the string, substituting new or reconditioned battery units for the end battery units 122a, and reconnecting the string, which will substantially reduce the length of a maintenance period in comparison to complete replacement of a battery string 120. It may also be possible, although less preferable, to beneficially affect the service life of omitted battery units 122 and/or battery cells 124 at other locations within the battery string 120, such that the plurality of battery units 122 or battery cells 124 described above may not need to be electrically/operatively contiguous as generally shown in FIGS. 1-3. For example, a battery unit 122 or battery cell 124 disposed near the middle of the battery string 120 may be only indirectly exposed to pulsation energy through operation of the system on adjacent battery units 122 or battery cells 124, as appropriate, within the battery string 120. Such systems are intended to fall within the scope of the claims unless explicitly disclaimed.

Figure 4:
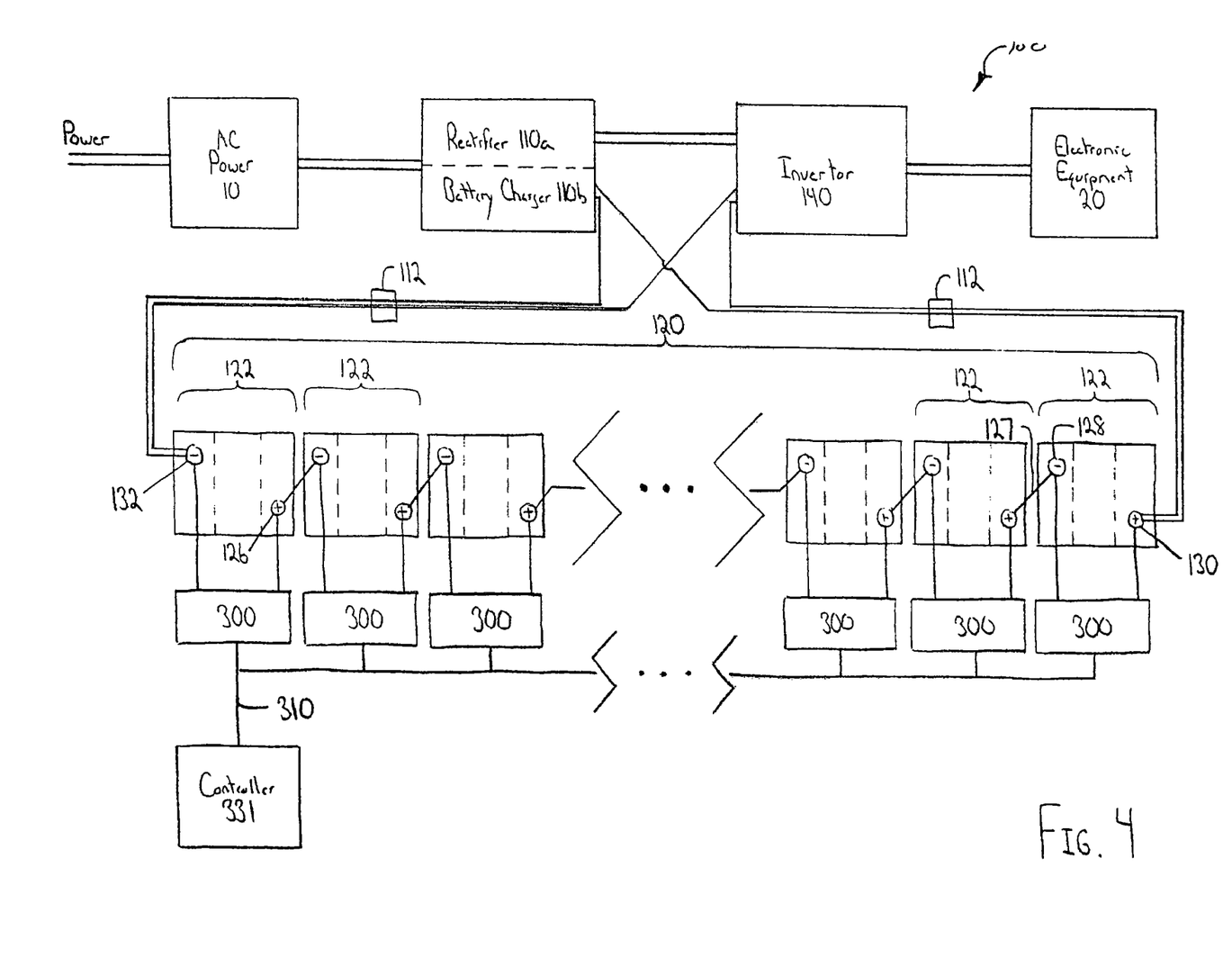
FIG. 4 is a functional diagram of yet another system for applying pulsation energy connected to an online battery backup system.
Figure 4A:
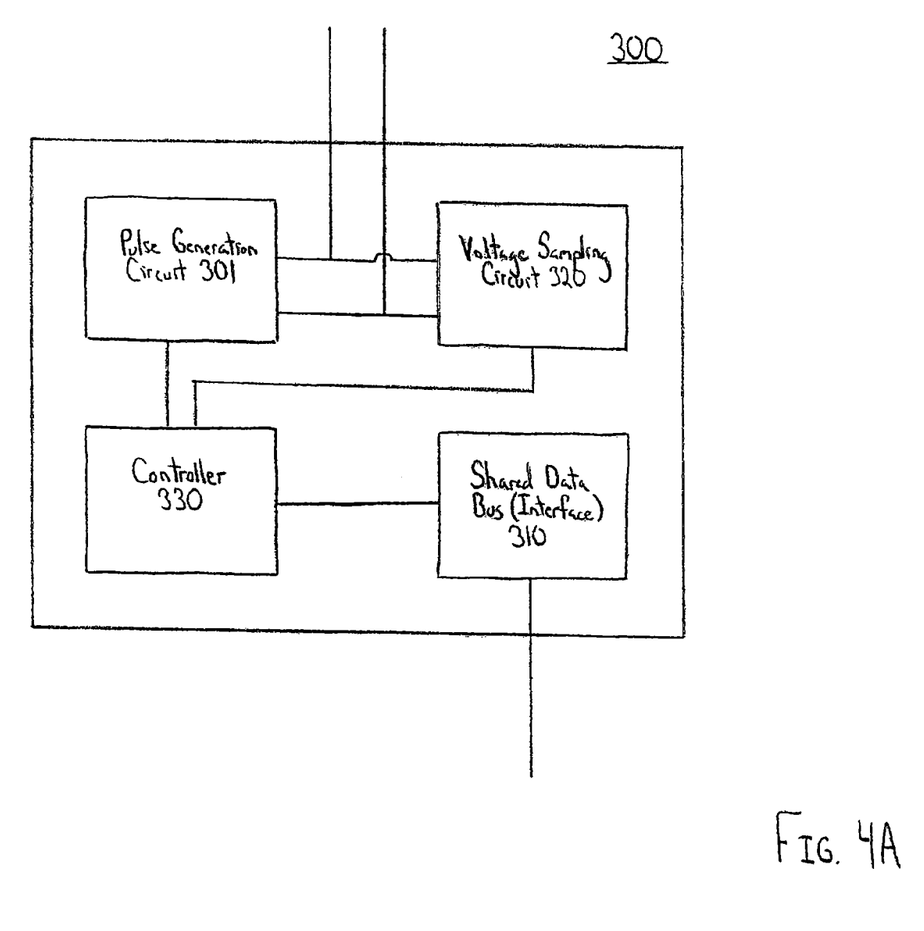
FIG. 4a is block diagram of the module of the system of FIG. 4.

A second system, shown in FIGS. 4 and 4a, provides a module 300 including both a pulse generation circuit 301 and a voltage sampling circuit 320 for operative connection to a pair of terminals 126, 128 on a battery unit 122 or battery cell 124, as appropriate. The pulse generation circuit 301 and voltage sampling circuit 320, described above using reference numbers 200 and 220, may be operatively connected in parallel to the terminals 126, 128. The module 300 may further include a controller 330 operatively connected to each of the pulse generation circuit 301, a shared data bus 310, and the voltage sampling circuit 320. The controller 330 is preferably a programmable logic controller or a functionally equivalent combination of hardware and software providing for logic control of a circuit, data acquisition through an analog-to-digital converter, and remote communications, but may be a more capable device such as a microprocessor controlling I/O hardware if, for example, the module 300 is to operate as part of system using cooperative peers. Alternately, the module 300 may be controlled directly by a external, multiple channel master controller 331 via bundled communication lines having a layout similar to the shared data bus 310. Such an alternative represents a simplified version of the aspects discussed below, and will not be discussed in detail.

The shared data bus 310 is adapted to interconnect a plurality of modules 300, each disposed across the terminals 126, 128 of a battery unit 122 or a battery cell 124, as appropriate, with modules 300 collectively providing voltage sampling circuits 320 and pulse generation circuits 301 which may be polled and operated so that only one of the pulse generation circuits 301 is operated at a time. Thus the system may apply pulsation energy to only one of a plurality of battery units 122 at a time or, preferably, to only one of a plurality of battery cells 124 within the plurality of battery units 122 at a time. Such collective action can be achieved by various techniques. For example, a master controller 331 may be programmed to operate a plurality of modules 300 according to an aspect of the methods described below by polling the modules 300 to obtain a set of float voltage drops and then instructing a selected module 300 to operate its pulse generation circuit 301. The master controller 331 may be a separate element, as shown, or may be an element of a module 300, augmenting or even functionally replacing a controller 330 in that module. For further example, the controllers 330 may be programmed to act as cooperative peers, with each signaling and obtaining float voltage drops using the shared data bus 310, and each signaling when its pulse generation circuit 301 is active in order to prevent the other modules 300 from operating their pulse generation circuits 301 at the same time. The individual modules 300 would then be programmed to operate in an event-driven cycle where each would signal a float voltage drop, obtain float voltage drops signaled by other modules, and then operate their own pulse generation circuit 301 according to an aspect of the methods described below, signaling when their pulse generation circuit 301 was active.

When a module ceases to signal that its pulse generation circuit 301 was active, the plurality of modules 300 may begin another cycle of operation as described above.

Figure 5:
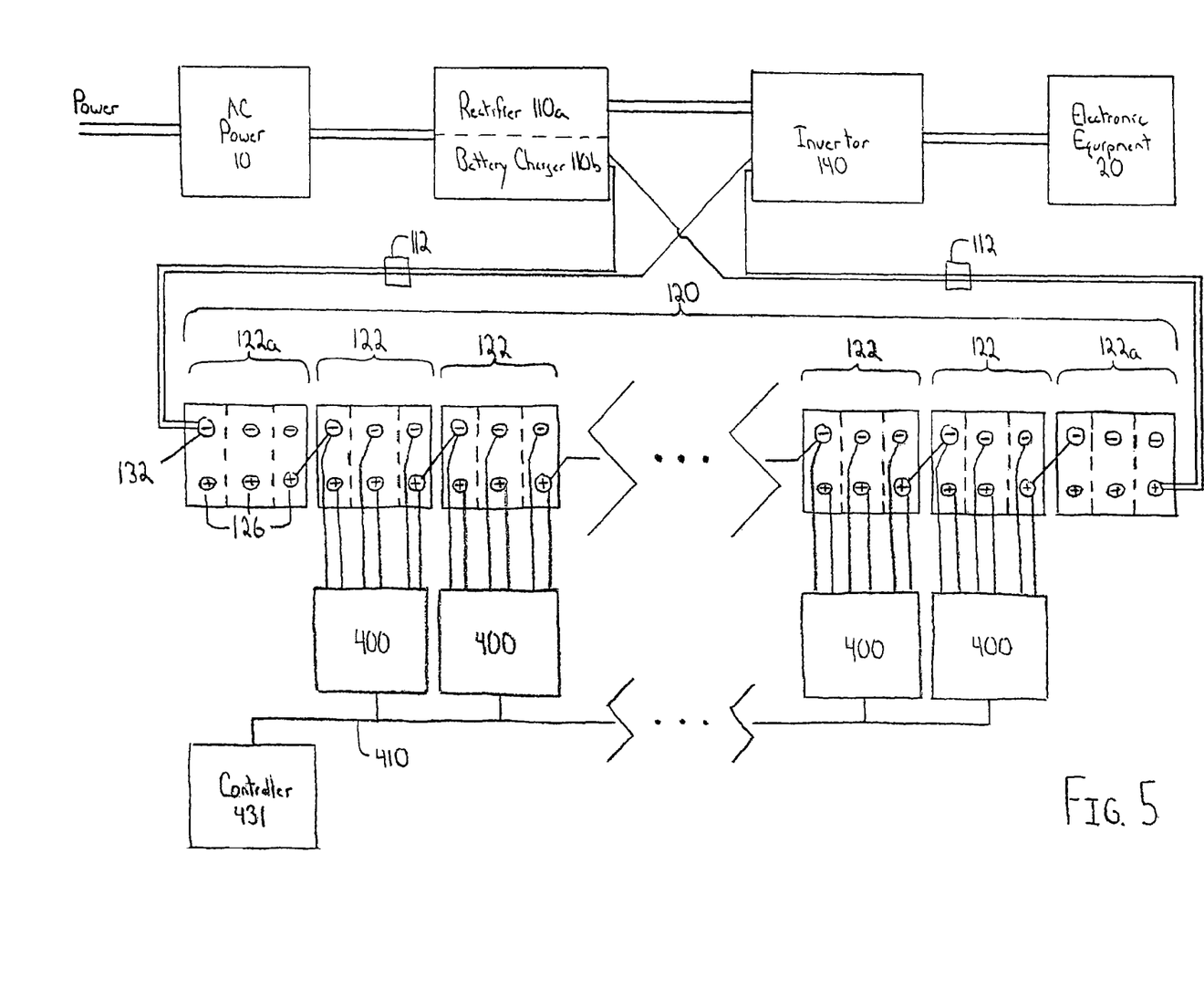
FIG. 5 is a functional diagram of still another system for applying pulsation energy connected to an online battery backup system.
Figure 5A:
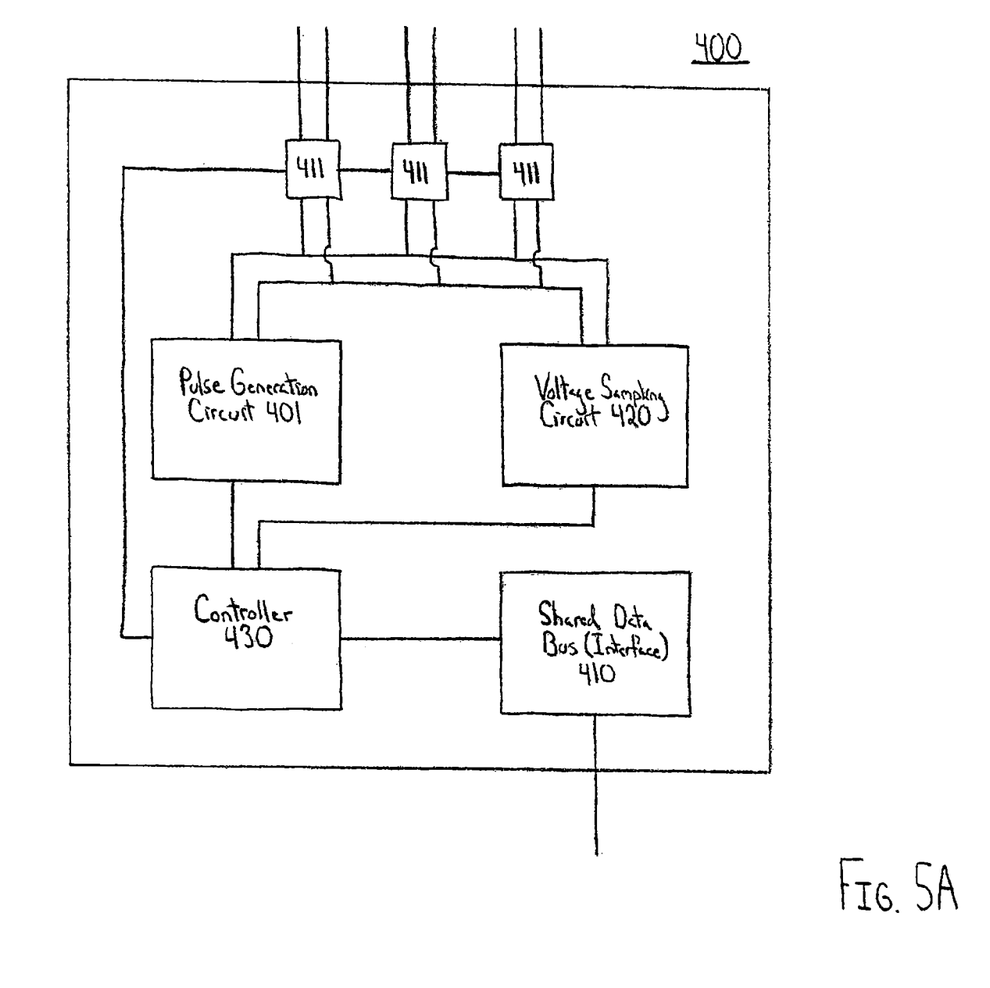
FIG. 5a is block diagram of the module of the system of FIG. 5.

A third system, shown in FIGS. 5 and 5a, provides a module 400 that is a hybrid of the first and second systems described above, including both a pulse generation circuit 401 and voltage sampling circuit 420 operatively connected to a plurality of switch devices 411, with the plurality of switch devices 411 being operatively connectable to the terminals 126, 128 of individual battery cells 124 in a battery unit 122 such that a circuit can be formed between the circuits 401, 420 and across the terminals 126, 128 of any one of the battery cells 124 within that battery unit 122. The module 400 further includes a controller 430 operatively connected to each of the pulse generation circuit 401, a shared data bus 410, the plurality of switch devices 411, and the voltage sampling circuit 420. The controller 430 may be programmed to operate the plurality of switch devices 411, sample the voltage sampling circuit 420, signal and receive sampled voltage differences across the shared data bus 410, and operate the pulse generation circuit 401 according to an aspect of the methods applicable to individual battery cells described below. The shared data bus 410 is adapted to interconnect a plurality of modules 400, each operatively connectable to the terminals 126, 128 of a different battery unit 122, with the controllers 430 within the plurality of modules 400 acting collectively to operate the voltage sampling circuits 420, switch devices 411, and pulse generation circuits 401 in the individual modules 400 so that pulsation energy is applied by only one of the pulse generation circuits 401 at a time across the terminals 126, 128 of only one of the battery cells at a time. As described above with respect to the second system, such collective action can be achieved by various techniques, including the use of a master controller 431 or programming causing the controllers 430 to act as cooperative peers. Advantageously, each module 400 may be powered by the battery unit 122 to which it is attached so that, upon installation, the modules 400 need only be interconnected by the shared data bus 410. Also advantageously, each module may additionally (or alternately) be preconfigured to be affixed to a predetermined model or class of battery unit 122 with prepositioned connectors seating on the terminals 126, 128 of the battery unit 122. Such features would allow for simplified installation of the system and, indirectly, simplified maintenance of the battery string 120 during replacement of the constituent battery units 122.

The controllers, 230, 330 and/or 331, and 430 and/or 431, described above may include or otherwise interface with a timer, 232, 332, or 432, respectively, so as to support timed modes for operation of the pulse generation circuits, as further described below. The controllers 230, 330 and/or 331, and 430 and/or 431 may also be programmed to alter the operation of the pulse generation circuits under various conditions such as, for example, conditions where a lead-acid battery string 120 lacks any significant degree of sulfation or, for further example, conditions where the battery string 120 is in use. In some aspects, the pulse generation circuits 200, 301, 401 may vary the power of the generated pulsation energy in response to a signal from the controller, 230, 330 or 331, and 430 or 431, respectively, so that when desulfation is desired, a power sufficient to decompose crystals of lead sulfate that have formed within a lead-acid based battery unit 122 or battery cell 124, as appropriate, is applied, but when suppression of sulfation is desired, a power sufficient to suppress, but not to reverse, the formation of deposits in relatively new batteries. For example, the controllers, 230, 330 or 331, and 430 or 431, respectively, may be programmed to operate the pulse generation circuit 200, 301, or 401, respectively, to apply the higher level of power when the float voltage drop across a battery unit 122 or battery cell 124 is greater than a predetermined value, but to apply the lower level of power when the float voltage drop is less than the predetermined value. The aforementioned levels may be adapted or otherwise determined firsthand by performing a statistical analysis of float voltage drops observed after the installation of new battery units within the battery backup system. Such programming would have the effect of further reducing the power of the pulsation energy applied to the battery string 120, and further reducing the transmission of EMI into powered electronic equipment when desulfation was not desired.

Methods for Applying Pulsation Energy

In one aspect, the present methods may minimize the application of pulsation energy to the above-described battery string 120 in order to limit or reduce the transmission of EMI into powered electronic equipment through the steps of:

1. Selecting one or more, but not all, battery units 122 from the battery string 120, wherein the battery units 122 may be selected randomly or based upon various criteria, such as float voltage drop;
2. Operating a pulse generation circuit to apply pulsation energy across the terminals 126, 128 of only the selected battery units 122; and
3. Ceasing to operate the pulse generation circuit in response to a predetermined trigger.

Optionally, one of more battery units 122 at the positive 130 and negative 132 ends of the string 120 may be omitted form the selection process. For example, in an effort to minimize the introduction of EMI into the powered electronic equipment, the first three battery units 122 at the positive end 130 of the string 120 and the last three battery units 122 at the negative end 132 of the string 120 may be omitted from the selection process such that only the battery units 122 between these six isolated battery units 122 receive pulsation energy.

In another aspect, the present methods minimize the application of pulsation energy to the above-described battery string 120 in order to limit or reduce the transmission of EMI into powered electronic equipment through the steps of:

1. Sampling at least one voltage sampling circuit in order to monitor the float voltage drop across the terminals 126, 128 of each battery unit 122 within a selected plurality of battery units;
2. Selecting from among the plurality of battery units the battery unit 122 having the greatest float voltage drop;
3. Operating a pulse generation circuit to apply pulsation energy across the terminals 126, 128 of only the selected battery unit 122; and
4. Ceasing to operate the pulse generation circuit in response to a predetermined trigger.

As discussed above, the selected plurality of battery units will not necessarily include every battery unit 122 within a battery string 120, and may exclude units such as end battery units 122a or, less preferably, units disposed in other portion of a battery string 120.

In methods employing a system with a plurality of switch devices interposed between the pulse generation circuit and the plurality of battery units 122, an implementation of the method may include the step of actuating the plurality of switch devices so that a circuit is formed between the pulse generation circuit and across the terminals 126, 128 of only the selected battery unit 122. On the other hand, in methods employing a system with a plurality of pulsation device modules or voltage sampling circuits, e.g., the modules 300 and 400 described above, the sampling step may further include the steps of signaling a float voltage drop over a shared data bus and collecting signaled float voltage drops for comparison.

For battery strings 120 including battery units 122 providing terminals 126, 128 for each battery cell 124, the method may further reduce the transmission of pulsation energy into powered electronic equipment through the steps of:

1. Sampling at least one voltage sampling circuit 220 to monitor the float voltage drop across the terminals 126, 128 of each one of a plurality of battery cells 124 within a plurality of battery units 122;
2. Selecting from among said plurality of battery cells 124 the battery cell 124 having the greatest float voltage drop;
3. Actuating a plurality of switch devices 210 such that a circuit is formed between a pulse generation circuit 200 and across the terminals 126, 128 of only the selected battery cell 124;
4. Operating the pulse generation circuit 200 to apply pulsation energy across the terminals 126, 128 of only the selected battery cell 124; and
5. Ceasing to operate the pulse generation circuit 200 in response to a predetermined trigger.

In methods employing a system with a plurality of switch devices interposed between the pulse generation circuit and the plurality of battery cells 124, an implementation of the method may include the step of actuating the plurality of switch devices such that a circuit is formed between the pulse generation circuit and across the terminals 126, 128 of only the selected battery cell 124. In methods employing a system with a plurality of pulsation device modules or voltage sampling circuits, e.g., the modules 300 and 400 described above, the sampling step may further include the steps of signaling a float voltage drop over a shared data bus and collecting signaled float voltage drops for comparison. Moreover, in methods employing equipment having both switches and a shared data bus, such as the modules 400 described above, implementations of the method may include all of the above described steps.

In one aspect, the predetermined trigger common to the aforementioned methods may be a float voltage drop that is less than the float voltage drop across the terminals of another battery unit 122 or battery cell 124, as appropriate. For example, in a system including a single voltage sampling circuit, e.g., circuit 220, a variant of the method may store values of the float voltage drop across the terminals 126, 128 for each one of the plurality of battery units 122, and then repeatedly sample the float voltage drop across the terminals 126, 128 of the selected battery unit 122, ceasing to operate the pulse generation circuit when the value for the selected battery unit 122 becomes less than a stored value for one of the unselected battery units 122. However in systems including multiple voltage sampling circuits, a variant of the method may repeatedly compare the float voltage drop across the terminals 126, 128 of the selected battery unit 122 with the float voltage drop across the terminals 126, 128 of each of the unselected battery units, ceasing to operate the pulse generation circuit when the float voltage drop for the selected battery unit 122 becomes less than the float voltage drop of at least one unselected battery unit 122. For example, in methods employing a system with a plurality of pulsation device modules, such as the modules 300 or 400 described above, the other modules may continue to signal sampled float voltage drops across the shared data bus for reception and use by the active module.

In another aspect, the predetermined trigger of the method may be a predetermined interval of time. For example, in a system including a single voltage sampling circuit 220, a variant of the method may employ a timer, ceasing to operate the pulse generation circuit 200 when the timer lapses. The method could then be repeated, such that a different battery unit 122 or battery cell 124, as appropriate, may be selected if it has a greater float voltage drop, or the same battery unit 122 or battery cell 124, as appropriate, may be selected if it continued to have the greatest float voltage drop. The predetermined interval of time might be a fixed interval, or might be a variable interval that is determined based upon the float voltage drop of the battery unit 122 or battery cell 124, as appropriate, with a longer interval being used for greater float voltage drops. Of course in systems including multiple voltage sampling circuits 220 it would be possible to also employ a timer as a matter of convenience, rather than comparing sampled float voltage drops during operation of the pulse generation circuit.

Accordingly, the disclosed systems and methods may substantially lower operating and capital costs, while maintaining or even improving string reliability.

Although various aspects of the disclosed adjustable input pulsation device have been shown and described, modifications may occur to those skilled in the art upon reading the specification. The present application includes such modifications and is limited only by the scope of the claims.

What is claimed is:

1. A method of applying pulsation energy to an online battery backup system having a plurality of battery cells, each battery cell including a pair of terminals, the method comprising:
   sampling at least one voltage sampling circuit to monitor a float voltage drop across the pair of terminals of each battery cell within the plurality of battery cells;
   selecting from among the plurality of battery cells at least one battery cell, but not all remaining battery cells, having a float voltage drop greater than a float voltage drop of all remaining cells sampled of the plurality of battery cells; and
   supplying pulsation energy to the selected at least one battery cell, but not the remaining battery cells, sufficient to effect reconditioning of the selected at least one battery unit.

2. The method of claim 1, further comprising ceasing to supply pulsation energy across the pair of terminals of the selected at least one battery cell in response to a predetermined trigger.

3. The method of claim 1, wherein supplying pulsation energy includes operating a pulse generation circuit to supply pulsation energy to the selected at least one battery cell.

4. The method of claim 3, wherein operating a pulse generation circuit includes actuating a plurality of switch devices so that the pulse generation circuit forms a circuit only across the terminals of the selected battery cell.

5. The method of claim 1, wherein the sampling of at least one voltage sampling circuit includes signaling float voltage drops of each of the battery cells over a shared data bus, and collecting the signaled float voltage drops for comparison.

6. The method of claim 2, wherein the predetermined trigger is a float voltage drop that is less than the float voltage drop of an unselected battery cell of the plurality of battery cells.

7. The method of claim 2, wherein the predetermined trigger is a preset interval of time.

8. The method of claim 2, wherein said trigger is a predetermined target change in a float voltage drop of said selected at least one battery cell.

9. The method of claim 1, wherein said string of said battery cells includes a negative end battery cell and a positive end battery cell, and wherein said negative end battery cell and said positive end battery cell are excluded from selection during said selecting step.

10. The method of claim 1, wherein said string of said battery cells includes a negative end battery cell and a positive end battery cell, and wherein said negative end battery cell, and a first predetermined number of said battery cells of said string adjacent said negative end battery cell, and said positive end battery cell, and a second predetermined number of said battery cells of said string adjacent said positive end battery cell, are excluded from selection during said selecting step.

11. A battery pulsation system for an online battery backup system having a plurality of battery cells, wherein each of the cells includes a pair of positive and negative terminals, the pulsation system comprising:
a pulse generation circuit operatively connected to a plurality of switch devices;
a voltage sampling circuit; and
a controller operatively connected to said pulse generation circuit, said plurality of switch devices, and said voltage sampling circuit;
wherein said plurality of switch devices is configured so that a circuit can be formed selectively by said controller between said pulse generation circuit and across any one of said pairs of terminals within said plurality of battery cells and not remaining ones of said pairs of terminals; and
said controller being programmed to sample said voltage sampling circuit to monitor a float voltage drop across said terminals of at least two of said battery cells within said plurality of battery cells; select at least one of said at least two of said battery cells, but not all of said monitored battery cells, said at least one of said at least two of said battery cells having a float voltage drop greater than a float voltage drop of all remaining monitored battery cells; and actuate said pulse generation circuit to supply pulsation energy to said selected at least one of said at least two of said battery cells, but not all of said monitored battery cells, sufficient to effect reconditioning to said selected at least one of said at least two of said battery cells.

12. The battery pulsation system of claim 11, wherein said pulse generation circuit is adapted to apply a modulated current and voltage suitable for pulsing the individual battery cells of the online battery backup system.

13. The battery pulsation system of claim 12, wherein said pulse generation circuit is adapted to apply a modulated current and voltage sufficient only to suppress, but not reverse, formation of deposits resistant to decomposition by a typical float charge voltage.

14. The battery pulsation system of claim 11, wherein said pulse generation circuit and said voltage sampling circuit are connected in parallel to said plurality of switches via a bus.

15. The battery pulsation system of claim 11, wherein the online battery backup system further includes end battery units each having positive and negative terminals for connection, in part, to means for supplying equipment power, and wherein said controller is configured not to apply pulsation energy across the terminals of the end battery units at any time.

16. The battery pulsation system of claim 11, wherein the battery cells are interconnected cells of a battery unit of the battery backup system, and said pulse generation circuit and said voltage sampling circuit each are connected to each of the terminals of each of the interconnected cells of the battery unit.

17. A battery pulsation system for an online battery backup system having a plurality of battery units, each battery unit including a plurality of interconnected cells, each of the cells having a pair of positive and negative terminals, the pulsation system comprising:
at least one pulse generation circuit and at least one voltage sampling circuit, the circuits each being selectively connectable to the cells of one of the plurality of battery units across the pair of positive and negative terminals of the cells; and
a controller operatively connected to said at least one pulse generation circuit and said at least one voltage sampling circuit;
said controller being programmed to sample said at least one voltage sampling circuit, obtain float voltage drops across each of said pairs of positive and negative terminals of each of said plurality of interconnected cells of a selected one of said battery units, select one of said interconnected cells for pulsation, but exclude from said selection end ones of said interconnected cells of said selected one of said battery units, and operate said at least one pulse generation circuit to apply pulsation energy across said selected one of said pair of positive and negative terminals of said selected one of said plurality of interconnected cells.

18. The battery pulsation system of claim 17, wherein said pulse generation circuit is adapted to apply a modulated current and voltage suitable for pulsing the individual battery cells of the pluralities of battery cells.

19. The battery pulsation system of claim 18, wherein said pulse generation circuit is adapted to apply a modulated current and voltage sufficient only to suppress, but not reverse, the formation of deposits resistant to decomposition by a typical float charge voltage.

* * * * *